United States Patent Office 2,912,408
Patented Nov. 10, 1959

2,912,408

STORAGE STABLE MIXTURE OF A DIISOCYANATE AND THE REACTION PRODUCT OF A POLYESTER, A GLYCOL AND A DIISOCYANATE, AND METHOD OF MAKING SAME

Gunther Nischk, Leverkusen, and Karl E. Müller, Leverkusen-Bayerwerk, Germany, assignors, by direct and mesne assignments, of one-half to Mobay Chemical Company, Pittsburgh, Pa., a corporation of Delaware, and one-half to Farbenfabriken Bayer Aktiengesellschaft, Leverkusen, Germany, a corporation of West Germany No Drawing. Application November 30, 1954
Serial No. 472,230

Claims priority, application Germany November 30, 1953

11 Claims. (Cl. 260—45.4)

This invention relates to cross-linked plastics of high molecular weight and to a process for producing same.

Cross-linked plastics of high molecular weight have been produced by a process which involves reacting glycols with polyesters containing isocyanate groups. In this process, the polyester containing isocyanate groups is reacted with the glycol in an amount insufficient to react with all of the free isocyanate groups. The diisocyanates particularly suitable for this process are p-phenylene diisocyanate, 1,5-naphthalene diisocyanate and diphenylmethane diisocyanate. The glycols employed in this process are buylene glycol, quinitol, urea glycols such as bis-hydroxyethyl urea, and urethane glycols such as the reaction product of 2 mols of glycol with 1 mol of a diisocyanate.

Cross-linked plastics have also been produced by a process which comprises initially reacting diisocyanates with hydroxy polyesters and glycols containing at least two aromatic ring systems which may be fused together, the diisocyanates containing isocyanate groups which react at different rates. The proportions of the reactants are so selected that free hydroxyl groups are present after the reaction has been completed. In this manner, products soluble in solvents such as glycol monomethylether acetate are obtained which may be processed satisfactorily by rolling. These products which are stable on storage are reacted at a later selected time with an amount of aromatic diisocyanate in excess of the hydroxyl groups still present, the diisocyanate containing in the molecule two isocyanate groups which react at the same rate.

It has also been proposed to replace in the initial reaction of the foregoing process diisocyanates having groups reacting at different rates with those having groups which react at the same rate. The latter type includes diphenylmethane diisocyanate. The initial reaction products which are thus obtained are also soluble in glycol monomethylether acetate.

In accordance with this invention, it has now been found that highly elastic cross-linked plastics can be produced in two steps. In the first step, storable products of high molecular weight are obtained by reacting a mixture of a linear to predominantly linear hydroxy polyester and a glycol with a diisocyanate in such proportions that free hydroxyl groups are still present in the reaction product. In the second step, the storable product thus obtained is reacted with the same or a different diisocyanate in an amount in excess of that corresponding to the free hydroxyl groups remaining at the end of the first step.

The hydroxy polyesters which are preferably used as the starting materials in the process of the present invention are most expediently prepared from substantially saturated aliphatic products. Suitable acid components include malonic acid, succinic acid, adipic acid, carbonic acid, dihydromuconic acid, maleic acid, thio-dipropionic acid, sebacic acid and other dicarboxylic acids. Suitable alcohol components include ethylene glycol, 1,2-propylene glycol, 1,3-butylene glycol, 1,4-butylene glycol, 1,6-hexanediol, 1,4-butenediol, diethylene glycol and thiodiglycol. Hydroxycarboxylic acids may likewise be employed in the preparation of the polyesters, provided that sufficient of the dihydric alcohol is present to ensure the formation of terminal hydroxyl groups. Moreover, it is possible to use mixtures of different acids and dihydric alcohols, in which case mixed polyesters are obtained.

Other bifunctional reactants may also be used in relatively small quantities in place of the acids and alcohols. Examples of these are compounds which contain aromatic nuclei, such as phthalic acid or terephthalic acid, aromatic or aliphatic diamines, such as phenylene diamines, piperazine, ethylene diamine, and also amino alcohols, such as, for example, hydroxy-ethyl aniline and aminopropanol.

The polycondensation of the reactants is carried out by heating at 100–250° C. By using a small excess of dihydric alcohol and a sufficiently long heating period polyesters having substantially zero acid numbers are obtained. As shown in Examples 1 through 3, the acid number should be about 1. If possible, the OH number should be between 20 and 80 and preferably between 40 and 60. Before the reaction with the diisocyanates takes place, the polyesters prepared in this manner must be freed from any moisture which adheres to them under these conditions.

Among the glycols which are mixed with the hydroxy polyester in the process of the invention are, for example, aliphatic glycols, such as butylene glycol, diglycol, thiodiglycol and hexanediol; urea glycols, such as bis-hydroxyethyl urea; urethane glycols, such as the reaction products of 2 mols of butylene glycol with 1 mol of hexamethylene diisocyanate; amide glycols such as bis-hydroxyethyl-adipic acid diamide; cycloaliphatic glycols, such as quinitol; and glycols containing ester groups. These glycols are free from aromatic radicals. Depending upon the desired properties of the cross-linked plastic to be produced, different amounts of the glycol are mixed with the hydroxy polyester. Broadly speaking, 1–10% by weight of glycol, based on the weight of the polyester, have proven to be particularly suitable for obtaining valuable plastics.

p-phenylene diisocyanate and 1,5-naphthylene diisocyanate are diisocyanates which are particularly suitable for carrying out the initial reaction. These diisocyanates are reacted with the mixture consisting of hydroxy polyester and glycol in such proportions that the reaction product has a hydroxyl number of at least 5 and preferably of 10 to 25.

The products obtained from the initial reaction are soluble in glycol monomethylether acetate and are capable of being worked up satisfactorily on a roller without the addition of auxiliary agents. Completely smooth films are formed which can be stored without modification and/or cross-linking. These products are reacted at a later stage with an amount of diisocyanate in excess of the hydroxyl groups still present. In this reaction, which preferably takes place on a roller, no cross-linking of the thermoplastic material takes place, even at moderately elevated temperature. It is only when the material is deformed while heating that the cross-linking process occurs and brings about the formation of a high-grade elastic material.

The diisocyanates to be incorporated in the second or cross-linking reaction may be the same as those of the initial reaction, but diphenylmethane diisocyanate is particularly suitable for carrying out the cross-linking reaction. These diisocyanates are used in an amount in excess of that corresponding to the free hydroxyl groups remaining at the end of the initial reaction. In general, 5–10% by weight of diisocyanate, based on the weight of the storable product obtained in the first step, are used in the cross-linking reaction.

In the working up of cross-linked plastics of high molecular weight, it is important initially to form products of high molecular weight which can be stored as long as required and which are only converted into the cross-linked condition by the addition of another component. It is only under these conditions that it is possible for a plastic to be worked up in a manner similar to rubber.

The invention is further illustrated by the following examples, the parts being by weight.

*Example 1*

1000 parts of an adipic acid ethylene glycol polyester of OH number 63 and acid number 1.5 is dehydrated for 30 minutes in vacuo at 14 mm. and 100° C. and then 35 parts of 1,4-butylene glycol is added while stirring. After stirring well, 130 parts of p-phenylene diisocyanate is added at 100° C. and during the ensuing reaction, the temperature rises to 125° C. The temperature is allowed to fall to 120° C., then the mixture is cast as a block and thereafter further heated for 15 hours at 100° C. The resulting lengthened polyester which is soluble in glycol monoethylether acetate is thereafter rolled out on a roller in the form of a smooth film.

(A) For the production of a cross-linked highly elastic plastic, 5 parts of diphenylmethane diisocyanate per 100 parts of the lengthened polyester is at once or subsequently incorporated by rolling and the mixture is then pressed for 30 minutes at 150° C. into plates. The mechanical properties of the pressed plates are as follows:

Plate thickness _____ 3.1 cm.
Tearing strength _____ 292 kg./cm.$^2$.
Breaking elongation _____ 670%.
Loading at 300% elongation _____ 84 kg./cm.$^2$.
Elasticity _____ 50.
Hardness _____ 71.
Structure ring test _____ 31 kg. absolute.
(Calculated at 0.4 cm., 40 kg.)
Structure fan test _____ 50 kg./cm.
Resistance to needle scratch_____ 93 kg./cm.

The unpressed polyester containing diphenylmethane diisocyanate can be subjected to injecting molding at 50–70° C. to form tubes atnd tyre outer covers.

(B) 6 parts of diphenylmethane diisocyanate is incorporated by rolling with 100 parts of the lengthened polyester. After pressing for 30 minutes at 150° C., an elastic plastic is obtained having the following mechanical properties:

Thickness _____ 0.3 cm.
Tearing strength _____ 369 kg./cm.$^2$.
Breaking elongation _____ 750%.
Loading at 300% elongation _____ 92 kg./cm.$^2$.
Elasticity _____ 48.
Hardness _____ 74.
Structure ring test _____ 31 kg. absolute.
(Calculated at 0.4 cm., 41.4 kg.)
Structure fan test _____ 49 kg./cm.
Resistance to needle scratch _____ 101 kg./cm.

*Example 2*

1000 parts of an adipic acid ethylene glycol polyester of OH number 63 and acid number 1.5 is dehydrated for 30 minutes in vacuo at 14 mm. and 100° C. and then 20 parts of 1,4-butylene glycol is added while stirring. After stirring well, 135 parts of 1,5-naphthylene diisocyanate is added at 110° C. and during the resulting reaction, the temperature rises to 125° C. The temperature is allowed to fall to 120° C., then the mixture is cast as a block, and thereafter further heated for 15 hours at 100° C. The lengthened polyester thus obtained which is soluble in glycol monomethylether acetate is thereafter rolled out on a roller in the form of a smooth film.

(A) For the production of a cross-linked highly elastic plastic, 5 parts of diphenylmethane diisocyanate per 100 parts of the lengthened polyester is at once or subsequently incorporated by rolling and the mixture is then pressed for 30 minutes at 150° C. The mechanical properties of the pressed plate are as follows:

Plate thickness _____ 2.9 cm.
Tearing strength _____ 258 kg./cm.$^2$.
Breaking elongation _____ 720%.
Loading at 300% elongation _____ 59 kg./cm.$^2$.
Elasticity _____ 46.
Hardness _____ 68.
Structure ring test _____ 25 kg. absolute.
(Calculated at 0.4 cm., 35 kg. absolute.)
Structure fan test _____ 48 kg./cm.
Resistance to needle scratch _____ 81 kg./cm.

The unpressed polyester containing diphenylmethane diisocyanate can be subjected to injection molding at 50–70° C. to form tubes and tyre outer covers.

(B) 6 parts of diphenylmethane diisocyanate is incorporated by rolling with 100 parts of the lengthened polyester. After pressing for 30 minutes at 150° C., an elastic plastic is obtained having the following mechanical properties:

Thickness _____ 3.0 cm.
Tearing strength _____ 319 kg./cm.$^2$.
Breaking elongation _____ 790%.
Loading at 300% elongation _____ 60 kg./cm.$^2$.
Elasticity _____ 46.
Hardness _____ 68.
Structure ring test _____ 26 kg./absolute.
(Calculated at 0.4 cm., 35 kg./absolute.)
Structure fan test _____ 52 kg./cm.
Resistance to needle scratch _____ 98 kg./cm.

*Example 3*

1000 parts of an adipic acid ethylene glycol polyester of OH number 60 and acid number 1.0 is dehydrated for 1 hour in vacuo at 10 mm. and then 45 parts of quinitol is added while stirring. After stirring well and allowing the temperature to fall to 100° C., 125 parts of p-phenylene diisocyanate is added. During the ensuing reaction, the temperature rises to 125° C. The melt is then heated for 15 hours at 100° C. The resulting lengthened polyester of OH number 15 is rolled out on a roller in the form of a smooth film.

(A) For the production of a cross-linked plastic, 8 parts of diphenylmethane diisocyanate per 100 parts of the lengthened polyester is at once or subsequently incorporated by rolling. The final cross-linking is effected by heating for 30 minutes at 150° C. Upon storing for 25 hours at room temperature and heating for 20 hours at 100° C. the mechanical values are as follows:

Plate thickness _____ 3.5 mm.
Tearing strength _____ 240 kg./cm.$^2$.
Permanent elongation _____ 18%.
Breaking elongation _____ 590%.
Loading at 300% elongation _____ 45 kg./cm.$^2$.
Structure ring test _____ 37 kg./absolute.
Elasticity _____ 50.
Hardness _____ 71.
Structure fan test _____ 40 kg./cm.$^2$.
Resistance to needle scratch _____ 100 kg./cm.$^2$.

(B) When using 7 parts of p-phenylene diisocyanate per 100 parts of the lengthened polyester the mechanical values are as follows:

| | |
|---|---|
| Plate thickness | 3.0 mm. |
| Tearing strength | 235 kg./cm.$^2$. |
| Permanent elongation | 20%. |
| Breaking elongation | 530%. |
| Loading at 300% elongation | 40 kg./cm.$^2$. |
| Structure ring test of 4 mm. plate | 33 kg./absolute. |
| Elasticity | 50. |
| Hardness | 68. |
| Structure fan test | 41 kg./cm.$^2$. |
| Resistance to needle scratch | 85 kg./cm.$^2$. |

What is claimed is:

1. In the preparation of an elastomeric substantially non-porous polyurethane by a process which comprises reacting a polyester with an organic diisocyanate and a glycol to form a storable product and then reacting this product with additional diisocyanate, the method of making a storable product of improved stability which comprises mixing (1) a substantially linear polyester selected from the class consisting of a polyester prepared by esterification of a dicarboxylic acid and an aliphatic glycol and a polyester prepared by esterification of a dicarboxylic acid, a major amount of an aliphatic glycol and a minor amount of a compound selected from the class consisting of a diamine and an amino alcohol, said polyester having an acid number of about 1 and an OH number of from about 20 to about 80 and (2) from about 1 percent to about 10 percent by weight based on the weight of the polyester of a glycol having its hydroxyl groups attached to an organic radical of less than 16 carbon atoms, said glycol being free from aromatic radicals and selected from the group consisting of aliphatic glycols and cycloaliphatic glycols, and thereafter mixing the resulting mixture under substantially anhydrous conditions with (3) an organic diisocyanate in an amount insufficient to react with all of the functional groups of the polyester and glycol, effecting chemical reaction under substantially anhydrous conditions to form a millable adduct having terminal hydroxyl groups and an hydroxyl number of at least 5, and thereafter mixing the adduct with an excess of an aromatic diisocyanate.

2. The process of claim 1 wherein the diisocyanate mixed with the adduct is selected from the group consisting of p-phenylene diisocyanate, 1,5-naphthylene diisocyanate and diphenylmethane diisocyanate.

3. The process of claim 1 wherein the glycol is selected from the class consisting of butylene glycol, thiodiglycol and quinitol.

4. The process of claim 1 wherein said substantially linear hydroxy polyester is an adipic acid-ethylene glycol polyester.

5. The process of claim 1 wherein said substantially linear hydroxy polyester is an adipic acid-ethylene glycol polyester having an hydroxyl number within the range of from about 40 to about 60.

6. The process of claim 1 wherein said first mentioned organic diisocyanate is a member selected from the group consisting of p-phenylene diisocyanate and 1,5-naphthylene diisocyanate.

7. The process of claim 1 wherein said isocyanate-modified polyester has an hydroxyl number within the range of from about 10 to about 25.

8. The process of claim 1 wherein said second named organic diisocyanate is diphenylmethane diisocyanate.

9. The storage stable mixture prepared by a process which comprises mixing (1) a substantially linear polyester selected from the group consisting of a polyester prepared by esterification of a dicarboxylic acid and an aliphatic glycol and a polyester prepared by esterification of a dicarboxylic acid, a major amount of an aliphatic glycol and a minor amount of a compound selected from the class consisting of a diamine and an amino alcohol, said polyester having an acid number of about 1 and an OH number of from about 20 to about 80 and (2) from about 1 percent to about 10 percent by weight based on the weight of the polyester of a glycol having its hydroxyl groups attached to an organic radical of less than 16 carbon atoms, said glycol being free from aromatic radicals and selected from the group consisting of aliphatic glycols and cycloaliphatic glycols, and thereafter mixing the resulting mixture under substantially anhydrous conditions with (3) an organic diisocyanate in an amount insufficient to react with all of the functional groups of the polyester and glycol, effecting chemical reaction under substantially anhydrous conditions to form a millable adduct having terminal hydroxyl groups and an hydroxyl number of at least 5, and thereafter mixing the adduct with an excess of an aromatic diisocyanate.

10. The product of claim 9 wherein the glycol mixed with the polyester is selected from the group consisting of butylene glycol, thiodiglycol and quinitol.

11. The product of claim 9 wherein the diisocyanate mixed with the adduct is selected from the group consisting of p-phenylene diisocyanate, 1,5-naphthylene diisocyanate and diphenylmethane diisocyanate.

References Cited in the file of this patent

UNITED STATES PATENTS

| | | |
|---|---|---|
| 2,621,166 | Schmidt et al. | Dec. 9, 1952 |
| 2,625,532 | Seeger | Jan. 13, 1953 |
| 2,729,618 | Muller et al. | Jan. 3, 1956 |
| 2,741,800 | Brockway | Apr. 17, 1956 |
| 2,753,319 | Brockway | July 3, 1956 |
| 2,764,565 | Hoppe et al. | Sept. 25, 1956 |
| 2,777,831 | Seeger et al. | Jan. 15, 1957 |
| 2,780,350 | Simon et al. | Feb. 5, 1957 |

FOREIGN PATENTS

| | | |
|---|---|---|
| 878,856 | Germany | June 8, 1953 |
| 150,416 | Australia | May 3, 1951 |

OTHER REFERENCES

Curphey: British Plastics, October 1954, pages 407–409.